United States Patent [19]
Takata

[11] Patent Number: 5,092,526
[45] Date of Patent: Mar. 3, 1992

[54] VENTURI SYSTEM FOR AGRICULTURAL SPREADERS OF SOLID PARTICLES

[75] Inventor: Harry H. Takata, Edina, Minn.

[73] Assignee: Ag-Chem Equipment Co., Inc., Minnetonka, Minn.

[21] Appl. No.: 641,666

[22] Filed: Jan. 15, 1991

Related U.S. Application Data

[63] Continuation of Ser. No. 539,866, Jun. 18, 1990, abandoned, which is a continuation of Ser. No. 315,277, Feb. 24, 1989, abandoned.

[51] Int. Cl.⁵ .............................................. A01C 15/04
[52] U.S. Cl. .................................... 239/655; 239/654; 406/144; 406/155
[58] Field of Search ............... 239/325, 345, 346, 654, 239/655; 222/630; 417/178, 182; 406/144, 153, 155

[56] References Cited

U.S. PATENT DOCUMENTS

| | | | |
|---|---|---|---|
| 749,300 | 1/1904 | Kemp | 406/144 X |
| 957,126 | 5/1910 | Tilley | 406/144 |
| 2,237,229 | 4/1941 | Johnson | 43/148 |
| 3,206,255 | 9/1965 | Gray | 406/144 X |
| 3,586,237 | 6/1971 | Taylor | 239/78 |
| 3,730,395 | 5/1973 | Gallogly et al. | 222/145 |
| 4,008,854 | 2/1977 | van der Lely et al. | 239/655 |
| 4,215,824 | 8/1980 | Weiste | 239/655 |
| 4,280,419 | 7/1981 | Fischer | 239/654 X |
| 4,709,860 | 12/1987 | Patrick et al. | 239/654 |
| 4,767,062 | 8/1988 | Fletcher | 239/655 |
| 4,852,809 | 8/1989 | Davis et al. | 239/654 |
| 4,4898,892 | 12/1984 | Tyler | 239/655 X |

FOREIGN PATENT DOCUMENTS

| 511611 | 4/1955 | Canada | 406/144 |
| 706091 | 4/1941 | Fed. Rep. of Germany | 406/144 |

Primary Examiner—Andres Kashnikow
Assistant Examiner—William Grant
Attorney, Agent, or Firm—Haugen and Nikolai

[57] ABSTRACT

An improved system for pneumatic spreader systems for distribution of particulate material upon agricultural fields, and wherein the spreader system employs a number of elongated hollow delivery or discharge booms. The improved feature of the present invention comprises a Venturi which is mounted within each of the booms, with the Venturi being positioned immediately adjacent and upstream from the point at which particulate materials are being fed into the boom. The Venturi includes a throat portion which extends along and across a chordal line of the hollow delivery boom, and in addition includes a blade means which is in generally opposed relationship to the Venturi throat. The blade is angularly positioned within the boom, and in converging relationship with the distal tip of the boom and is arranged to define a substantially rectangular opening between the tip of the blade means and the top surface of the Venturi throat.

3 Claims, 2 Drawing Sheets

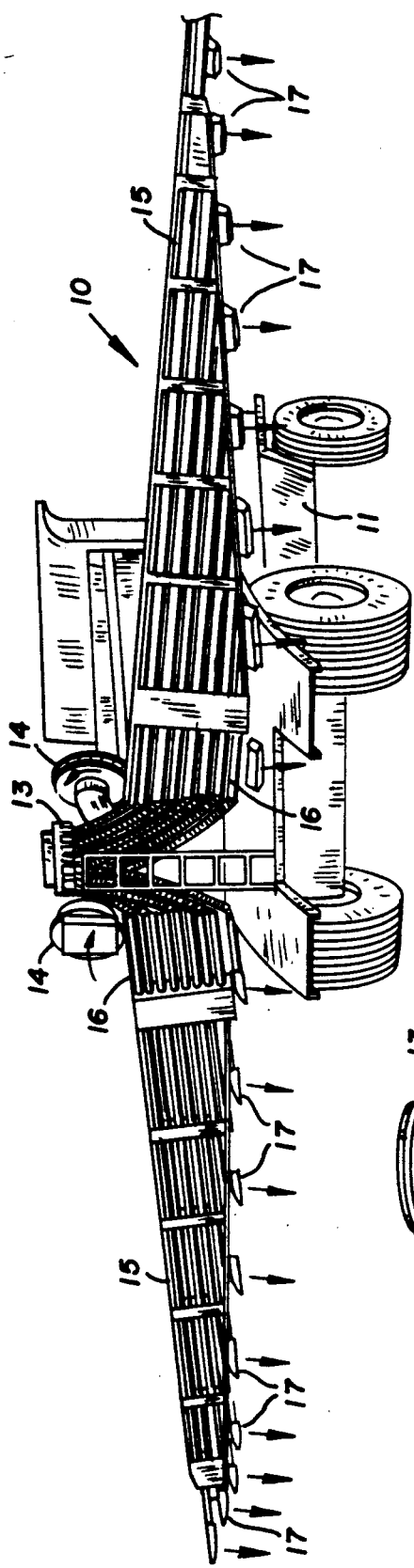
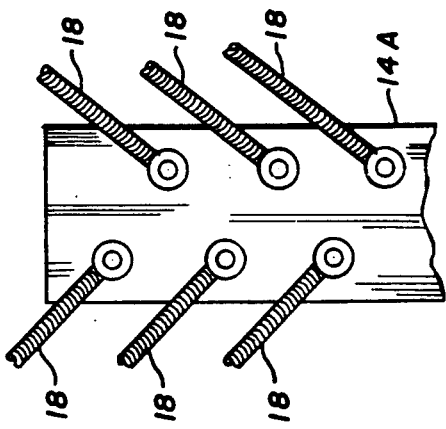
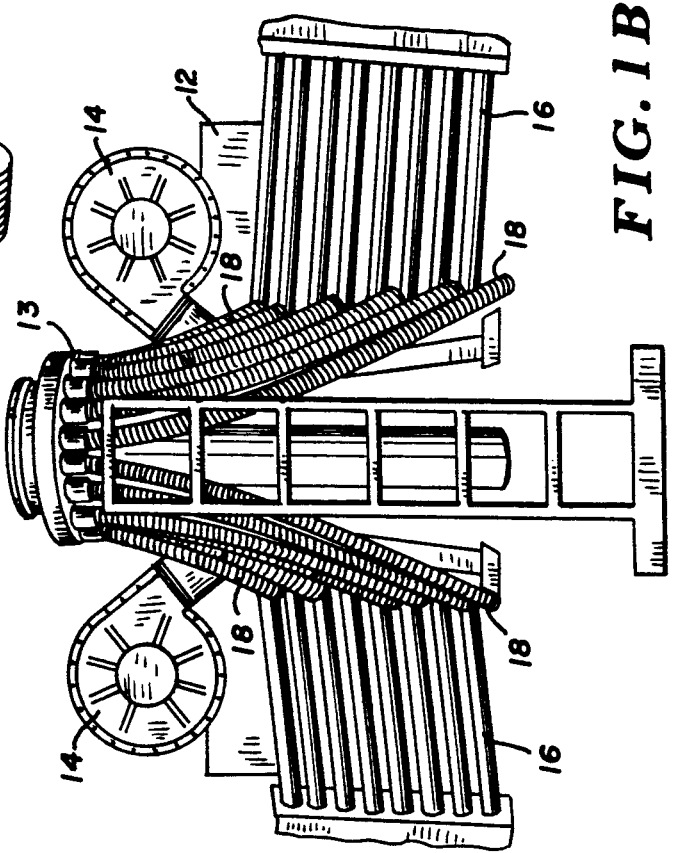
FIG.1A
FIG.1B
FIG.1C

VENTURI SYSTEM FOR AGRICULTURAL SPREADERS OF SOLID PARTICLES this is a continuation of copending application Ser. No. 07/539,866, filed on June 18, 1990, now abandoned, which is a continuation of application Ser. No. 07/315,277, filed Feb. 24, 1989, now abandoned.

BACKGROUND OF THE INVENTION

The present invention relates generally to an improved pneumatic spreader system for distribution of particulate material or pulverulent solids upon the soil, and more particularly to a system for achieving such distribution which is less prone to clogging, and which achieves a more uniform distribution of solids through booms of varying lengths within a given distributor. Pressurized pneumatic systems for the distribution of particulate solids are known, and have been used for such purposes in the past, however the systems currently in use suffer from the disadvantage of occasional clogging of particulate solids within the distribution tube, or from uneven discharge of solids through the distributor system.

Agricultural techniques require the utilization of soil treating agents to either encourage, discourage, destroy, or inhibit plant growth. Such agents may generally be characterized as crop treating chemicals, and include such materials as nutrients such as fertilizers, and pesticides such as insecticides and pre-emergent or post-emergent plant growth inhibitors. In other words, the term "crop treating chemical" is used in a comprehensive sense to incorporate those various ingredients utilized in agriculture to treat either the soil, plants, or insects. Active materials used for treatment are commonly found in one of three forms, either water soluble, water wettable, or in particulate solid form. In connection with the present invention, particulate solids or granular materials are of interest, with the system of the present invention being particularly adapted for use in connection with the distribution of such materials onto the soil or other surfaces being treated.

In the treatment of agricultural fields and crops through spreading of an active treating ingredient, the efficiency of the treatment operation may be enhanced if the load to be carried is reduced. Therefore, the utilization of dry particulate solids will substantially reduce the load requirement, inasmuch as water or other treatment medium or treatment vehicle is not required. The utilization of pressurized pneumatic systems will normally eliminate the need for utilization of water, and with pneumatic systems normally utilizing a compressor in lieu of a liquid pressure source for delivery of the treating ingredient.

One common problem encountered with pressurized pneumatic systems for distribution of particulate solids or granular materials is that of uniformity of distribution. One factor leading up to lack of uniformity of distribution is a tendency for the granular materials to become lodged in the distribution system, thereby clogging or partially clogging a portion of the system. Such an event will, of course, impede normal air flow through the system. The pressurized pneumatic systems normally employ a plurality of elongated hollow delivery booms, with these booms being of predetermined and differing lengths, and extending laterally outwardly of the supporting vehicle. By extending the length of individual elongated delivery booms on either side of the vehicle, the area of coverage may be correspondingly increased. However, as boom length increases, problems with clogging, material build-up, and the resulting lack of uniformity of distribution have been found to increase proportionately. The features of the present invention have been found to reduce the tendency to clog, and thus enhance the uniformity of distribution of particulate solids from the system and onto the soil, with the system having been found to decrease material build up in certain portions of the system, particularly portions of the delivery booms. Conventional systems have been found to experience clogging and material build up, particularly at the point where the granular materials are being introduced into the flow of air. The features of the present invention have been found desirable for improving the performance of systems using elongated hollow discharge or delivery booms.

SUMMARY OF THE INVENTION

Briefly, and in accordance with the present invention, an improved granular chemical application system is provided which improves the performance of pressurized pneumatic applicator systems by providing for substantially uniform distribution of particulate solids upon the surface of the soil. The improved system is preferably mounted upon a vehicle such as a self-propelled vehicle including either a tractor or trailer chassis, with the system including a reservoir with a source of supply of agricultural crop treating chemicals in granular or particulate solid form to be distributed, such as, for example, a nutrient such as a fertilizer and/or a pesticide such as an insecticide or herbicide, along with a spreader or distribution mechanism. The system is provided with a number of conventional components, including the following:

(a) a reservoir or hopper for retaining a supply of particulate solids;

(b) a means of conveying the particulate solids to a distribution head where the supply is metered by being divided into a number of aliquot portions;

(c) a means for delivering the metered aliquot portions to the booms; and (d) a means, such as a blower delivering a supply of compressed air, for moving the material outwardly of the booms and to a point of discharge.

Turning to these components briefly, and individually, a distribution head is provided, as indicated, for receiving a supply of particulate solids, and for metering and apportioning these solids into a plurality of generally aliquot portions. Such distribution heads are well known in the art, and the present system is well adapted for use with any of a variety of such heads. A plurality of elongated hollow discharge or delivery booms are employed in the system, with the proximal end of each boom being coupled to and receiving a source of pressurized or compressed air such as at a plenum chamber, which receives its charge of air from a blower. A tubular conduit or feed supply tube is coupled to the output of the distribution head, and is adapted to convey one aliquot portion to a junction point located adjacent the inner or proximal end of a discharge or delivery boom at a point closely spaced and immediately downstream from the proximal end of the boom. The flow of air through the booms therefore provides a dual purpose, one purpose being to carry granular material to the discharge point of the boom, the other being to create a partial vacuum in the tubular conduit or feed supply tube for injection of granular solids into the air stream. Therefore, each conduit or tubular feed member delivers one aliquot portion from the distribution head into the boom, with the compressed air carrying or moving the particulate solids outwardly to the delivery point located at the boom tip. In order to improve the introduction and transfer of particulate solid or granular material into the boom, particularly at the point of injection, an improved Venturi means is provided in accordance with the present invention. The improved Venturi is mounted within each of the booms at a point immediately upstream from and adjacent the junction of the boom with the tubular feed member.

The Venturi means comprises a flow wedge which includes an inlet ramp portion, an outlet ramp portion, and a throat portion intermediate the inlet and outlet ramp. The throat portion is designed to extend generally along a chordal line across the expanse of the cross-section of the hollow delivery boom. In addition, a blade means is provided in generally opposed relationship to the throat portion of the Venturi, with the blade means having an outer tip which, itself, extends generally along a chordal line across the boom and in generally parallel relationship to the chordal line defined by the Venturi throat. The blade means further extends radially inwardly of the boom and at an angle which converges toward the distal end of the boom. The opening which is defined between the inner tip of the blade and the surface of the Venturi ramp is substantially rectangular. This rectangular configuration for the open area or zone provides a means for equalizing the flow of air across the entire opening within the boom, with this feature having been found to considerably reduce any tendency of the granular material to build up in the area of the Venturi and thus contribute to clogging. The axial position of the blade means along the boom is such that the inner tip of the blade, in addition to being in opposed relationship to the Venturi throat, intersects at least a portion of an imaginary projection of the tubular feed member from its intersection with the hollow delivery boom.

While pressurized pneumatic spreader systems known in the past have employed Venturi means to assist in the distribution of the particulate solids, and to assist in introduction of particulate solids into the booms. Specifically, the Venturi means utilized in the past have normally been formed by introducing the tubular feed member a certain distance into the interior of the boom, thereby forming a partial constriction. The configuration of the open area when created in this fashion was generally crescent-shaped, with the ends tapering inwardly. Such a configuration has been found to contribute significantly to clogging, particularly at and adjacent the tips of the crescent-shaped opening. The present Venturi arrangement, with the configuration of its constricted opening being generally rectangular, is designed to maintain an even and continuous flow of air and solids through the system, so as to avoid clogging of the boom with quantities of granular material or particulate solids. The blade design is such that it is normally set in place and with its position designed to provide for an even distribution of particulate solids through the boom. However, the blade may be adjustably positioned in response to changes in flow rates achieved or experienced from the downstream portions of one or more of the booms. In connection with the system of the present invention, it has been found that the Venturi/blade combination and the configuration of the constriction which it provides, aids in effecting even and positive flow for the solids entering the boom. In other words, the blade provides a throat configuration and dimension which achieves constant, continuous, and predictable flow to assist in control and movement of particulate solids into and through the elongated boom structures.

Therefore, it is a primary object of the present invention to provide an improved system for delivery of granular material or particulate solids from a pressurized pneumatic system, wherein an improved Venturi means is mounted in place in order to more uniformly and more continuously deliver particulate solids into the flow of pressurized air moving through each of the delivery booms.

It is yet a further object of the present invention to provide an improved Venturi system for use in combination with pressurized pneumatic systems for distribution of particulate solids, and wherein the system includes a Venturi mounted within each of a plurality of hollow delivery booms, and wherein the Venturi includes a cooperating blade which is mounted in opposed relationship to the throat portion of the Venturi, and which is designed to control the flow of air and introduction of particulate solids into the flow of air moving through the system.

It is yet a further object of the present invention to provide an improved pressurized pneumatic system for the distribution of particulate solids upon an agricultural field, and wherein the system is provided with an improved means for maintaining an even flow of solids through the tube, and wherein means are further provided to avoid clogging of the particulate solids in and along the hollow delivery boom.

Other and further objects of the present invention will become apparent to those skilled in the art upon a study of the following specification, appended claims, and accompanying drawings.

BRIEF DESCRIPTION OF THE DRAWINGS

FIG. 1A is a perspective view of the side and rear portions of a typical vehicle chassis supporting a vehicular-mounted system incorporating a distribution head, a compressor, and a plurality of elongated hollow delivery booms, and wherein the booms are provided with the improved Venturi flow-control means of the present invention;

FIG. 1B is a fragmentary perspective view of the central or manifolding portion of the system illustrated in FIG. 1A;

FIG. 1C is a detail side elevational view, partially broken away and on a slightly enlarged scale, of the upper portion of the plenum or manifold utilized to distribute and deliver pressurized air from a source into the individual booms, and with the lower portion of the plenum being broken away;

DESCRIPTION OF THE PREFERRED EMBODIMENT

Figure 2:
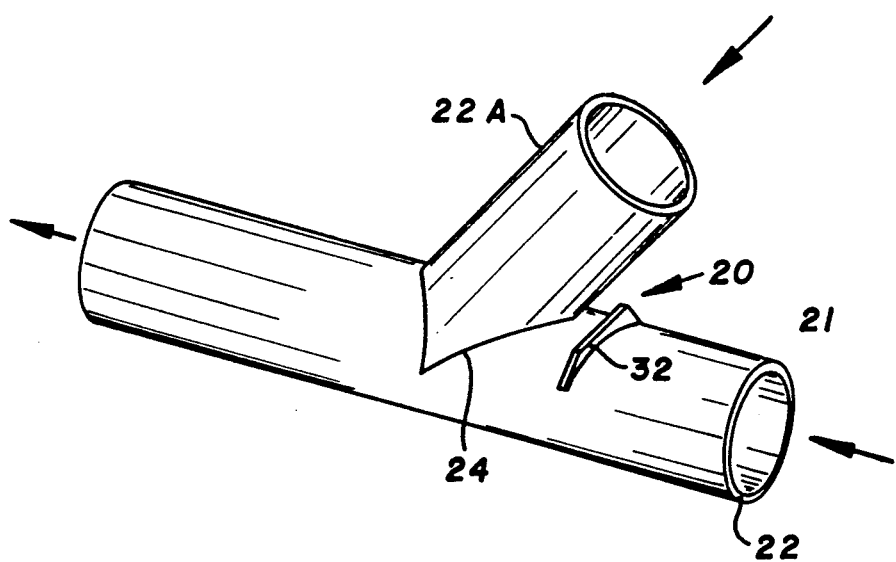
FIG. 2 is a detail perspective view of the external portions of the hollow delivery booms of the present invention, and illustrating the point at which the solid supply tube joins the delivery boom, and also the point at which the improved Venturi means of the present invention is positioned.

In accordance with the preferred modification of the present invention, and with particular attention being directed to FIGS. 1A and 1B of the drawings, the pressurized pneumatic distribution system generally designated 10 is mounted upon vehicle chassis 11, and includes a reservoir 12 for retaining a source of supply of particulate solids to be distributed through the system. A distribution head 13 is provided for apportioning or dividing the particulate solids received or delivered from reservoir 12 into a plurality of generally aliquot portions. A plurality of elongated hollow delivery booms 15—15 are provided to receive and deliver or spread the solids, with the booms being of predetermined and differing lengths, and extending laterally outwardly of the vehicle from proximal ends 16—16 to distal discharge ends 17—17. A source of compressed air such as blower 14 for the pressurized pneumatic system is utilized to create a flow of pressurized air into a plenum or manifold 14A and from the plenum into the proximal ends 16—16 of each boom, and ultimately through each of the hollow elongated booms 15 to outlet or discharge. Such blowers or other sources of compressed air, and their arrangement in this type of system is, of course, well known to those in the art, and need not be described in detail here. As is apparent in FIG. 1A, a cooler device may be employed in combination with one of the blowers in order to cool hydraulic fluid being used within the system. Such a device is illustrated in FIG. 1A, with this cooler being removed in the view of FIG. 1B. A plurality of tubular feed members 18—18 are also provided, with each of such tubular feed members extending between and coupling a selected output of the distribution head 13 to a selected one of said delivery booms 15—15. Also, as is conventional, the tubular feed members 18—18 provide for delivery of each of the aliquot portions into the elongated boom 15 at a point adjacent the proximal end 16, and for ultimate delivery to the distal discharge end 17 of the boom. Also, as indicated, such spreader structures are known in the art and need not be discussed and described in detail here. One such spreader structure is illustrated in U.S. Pat. No. 3,568,937 to Grataloup, with another such system being disclosed in U.S. Pat. No. 2,206,876 to Chater.

As will become apparent hereinafter, each of the tubular feed members 18—18 is coupled to a selected one of the hollow delivery booms 15—15 at a juncture point adjacent the proximal end of one of the booms, and thus achieves its purpose of continuously and uniformly introducing one aliquot portion of the particulate solids to the flow of pressurized air moving through each of the delivery booms. This introduction of particulate solids into the delivery booms is undertaken on a basis such that the actual introduction of the solids into the flow of pressurized air is enhanced, thereby reducing if not totally eliminating tendencies of the solid particles to build up in selected locations, and thereby tend to clog the output of the boom.

Figure 3:
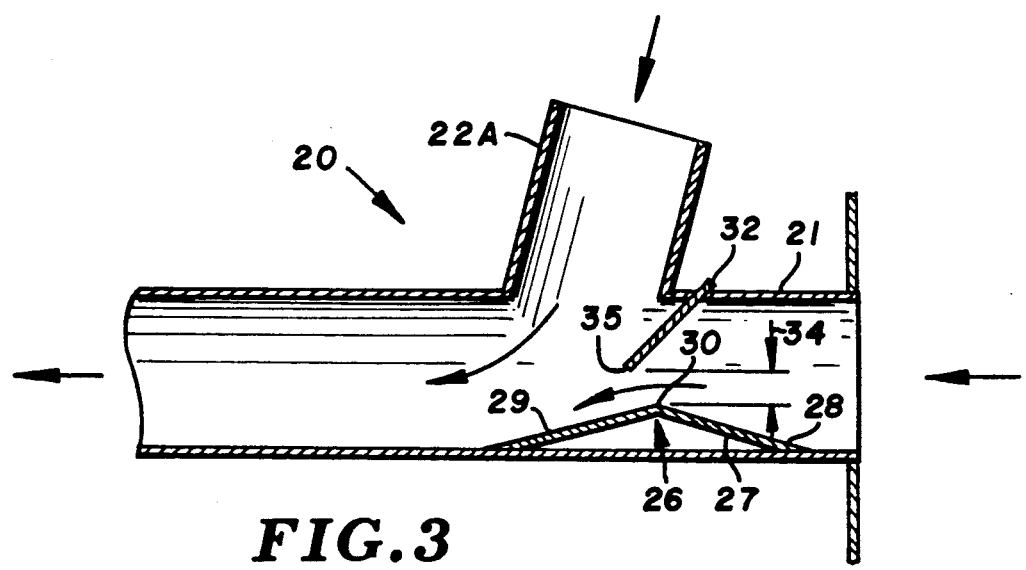
FIG. 3 is a view taken through the diameter of that portion of the device illustrated in FIG. 2.
Figure 4:
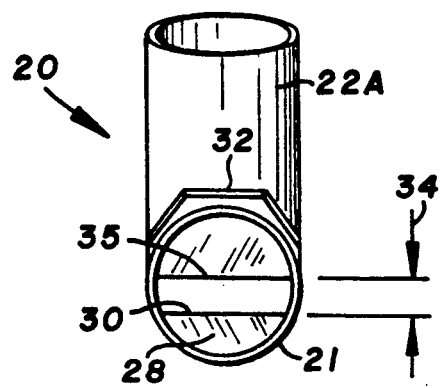
FIG. 4 is an end view of that portion of the device illustrated in FIG. 1A.

Attention is now directed to FIGS. 2-4 of the drawings wherein details of the Venturi arrangement provided within each of the hollow delivery booms is disclosed. Specifically, and with attention being directed to FIGS. 2-4 of the drawings, the Venturi-containing portion generally designated 20 of the system 10, comprises an axial segment 21 of one of the delivery booms 15—15, with the end 22 being an end adjacent the inner or proximal end of tube 21. A segment of a tubular feed member 22A is also shown, with this segment having been previously referred to as one of the plurality of tubular feed members 18—18. Tube segment 22A is coupled With boom segment 21 at juncture point 24.

Venturi means are provided within the system as shown generally at 26. Venturi 26 includes a body portion 27 with an inlet ramp 28, an outlet ramp 29, and a generally rectangular throat portion 30 therebetween. Throat portion 30 extends radially inwardly from the inner surface of the boom and defines generally a chordal line across the hollow delivery boom, such as is seen in the views of FIGS. 3 and 4. The Venturi means 26 further functions in cooperation with blade means 32, with blade means 32 being mounted in generally opposed relationship to the throat portion of the Venturi means 26. The zone between the radially inwardly disposed tip of blade 32 and the throat portion 30 defines a gap shown dimensionally at 34, and thus controlling the cross-sectional area available for the flow of air through the throat zone 30 of the Venturi 26. The tip of the blade 32 extends generally along a chordal line of delivery boom segment 21, with the tip being shown at 35 (FIG. 4).

The blade 32 is mounted at an angle which converges toward the distal end of the boom. Furthermore, the inner tip of blade 32, as at 35, intersects at least a portion of a projection of an inwardly directed projection of tubular feed member 22A into delivery boom segment 21. This disposition of blade 32 assists in controlling the constant width opening across the flow of air through the system and in creating the vacuum in tube 22A.

As indicated in the drawings, blade 32 is normally set in place, but can be made to be adjustably positioned in order to create the maximum vacuum in the tube 22A for normal operation. As indicated, blade 32 aids in effecting positive flow directions for the solids, and the configuration of the opening eliminates or substantially reduces any build up or clogging of particulate solids within the delivery tubes, such as within that segment of the tube shown at 21.

Attention is now directed to FIG. 1C of the drawings wherein the arrangement of the individual outlets is shown. This arrangement provides a system wherein the individual tubular feed members 18—18 can be disposed in an arrangement where they are less likely to interfere, one with the other. Additionally, it is believed that a more uniform flow of air results from the ( arrangement as illustrated in FIG. 1C.

Specifically, the coupling between the proximal ends 16—16 of the booms are arranged in staggered position at the point of coupling to the plenum body. Thus, and as illustrated in somewhat exaggerated form in FIG. 1C, the individual tubular feed members 18—18 may be arranged in neater and less concentrated positions.

In certain instances, it may be desirable to utilize a baffle and/or scoop in the plenum area so as to tend to equalize the flow of air through the individual booms. When utilized, such scoops and/or baffles are usually positioned and utilized on those booms which are disposed most closely adjacent the inlet of the pressurized air from the blower.

The system of the present invention is particularly adapted for use with systems having multiple hollow delivery booms of differing lengths. In certain instances, it has been found desirable to increase the diameter of the longer booms utilized in multiple boom systems in order to reduce back pressure in these longer boom members. Also, the outward portions of the longer booms may be coupled with an expanded zone so as to have at least a portion of the delivery boom provided with a somewhat increased diameter relative to the shorter booms. Such a design provides a means of reducing back pressure on longer booms, along with maximum vacuum in tube 22A coupled to the distributor head. Such an arrangement, taken together with the utilization of a Venturi of the type shown at 26, along with blade 32 has been found to provide distribution patterns which are generally more equal, one to another, than achieved in boom systems previously used.

It will be further appreciated that the details of the design illustrated here are for purposes of illustration only, and are not to be construed as a limitation upon the scope of the present invention.

What is claimed is:

1. In combination with a pressurized pneumatic system for substantially uniform distribution of particulate solids upon the soil from a system mounted upon a self-propelled vehicle and including a reservoir with a source of supply of particulate solids to be distributed, a distribution head means for metering and apportioning particulate solids from said source into a plurality of generally aliquot portions, a plurality of elongated hollow delivery booms of predetermined and differing lengths extending laterally outwardly of said vehicle from a proximal end to a distal discharge end, a source of compressed air for creating a flow of pressurized air through said hollow elongated booms, a plurality of tubular feed members, each extending between said distribution head and a selected one of said delivery booms, for delivery of each of said aliquot portions from the proximal end to the distal discharge end of a boom, and a juncture point adjacent the proximal end of each of said hollow elongated booms for introducing one aliquot portion of particulate solids from each of said tubular feed members to the flow of pressurized air moving through each of said delivery booms; the improvement comprising:

(a) Venturi means mounted within each of said hollow delivery booms between said juncture point and said proximal end immediately upstream from said juncture point, said Venturi means comprising a flow wedge defining a radially inwardly converging inlet ramp portion, a radially outwardly diverging outlet ramp portion and a throat portion a linear apex along the intersection intermediate said inlet and outlet ramp portions, with said throat portion defining the linear apex which extends generally along a substantially horizontally disposed linear chordal line across the entire width of said hollow delivery boom;

(b) said Venture means further comprising generally planar blade means cooperating with said flow wedge and being mounted along each of said hollow delivery boom in generally opposed relationship to the apex forming the throat portion of said Venturi means, said blade means being spaced from said tubular feed member and disposed immediately upstream therefrom and generally adjacent to and along the same side of the axis of the hollow delivery boom as the adjacent tubular feed member, said blade means further having a linear inner tip terminating at an edge which extends generally along a chordal line across said hollow delivery boom and extends radially inwardly of said hollow boom at an angle which converges toward the distal end of said boom, and wherein the inner edge of said blade means is arranged in generally parallelly disposed relationship with the apex forming said Venturi throat portion, and with the inner edge of said blade means intersecting at least a portion of a projected extension of the tubular feed member from its point of intersection with said hollow delivery boom, the arrangement being such that said Venturi means creates a partial vacuum within said hollow delivery boom adjacent and along the juncture point with said tubular feed member; and (c) said hollow delivery boom being substantially free of obstructions between said Venturi means and said distal discharge end.

2. The system as defined in claim 1 being particularly characterized in that said blade means is adjustably positioned within the cross-section of said delivery boom.

3. In combination with a pressurized pneumatic system for substantially uniform distribution of particulate solids upon the soil from a system mounted upon a self-propelled vehicle and including a reservoir with a source of supply of particulate solids to be distributed, a distribution head means for metering and apportioning particulate solids from said source into a plurality of generally aliquot portions, a plurality of elongated hollow delivery booms of predetermined and differing lengths extending laterally outwardly of said vehicle from a proximal end to a distal discharge end, a source of compressed air for creating a flow of pressurized air through said hollow elongated booms, a plurality of tubular feed members, each extending between said distribution head and a selected one of said delivery booms, for delivery of each of said aliquot portions from the proximal end to the distal discharge end of a boom, and a juncture point adjacent the proximal end of each of said hollow elongated booms for introducing one aliquot portion of particulate solids to the flow of pressurized air moving through each of said delivery booms; the improvement comprising:

(a) plenum means disposed between said source of compressed air and the proximal end of each of said booms for receiving a charge of compressed air and for distributing a portion of said charge to each of said booms, said plenum means having a face with a plurality of ports formed therein, with each port being coupled to the proximal end of one of said booms; and (b) said ports being arranged along the face of said plenum means in axially staggered relationship, one to another.

* * * * *